United States Patent [19]

Dunning

[11] Patent Number: 4,934,779
[45] Date of Patent: Jun. 19, 1990

[54] SYSTEM AND METHOD FOR LOW NOISE OPTICAL RETROREFLECTION WITH GAIN

[75] Inventor: Gilmore J. Dunning, Newbury Park, Calif.

[73] Assignee: Hughes Aircraft Company, Los Angeles, Calif.

[21] Appl. No.: 342,007

[22] Filed: Apr. 24, 1989

[51] Int. Cl.$^5$ .................. G02B 5/122; G03H 1/02
[52] U.S. Cl. .................... 350/102; 350/3.64; 350/446; 365/125
[58] Field of Search .............. 350/102, 103, 104, 105, 350/3.6, 3.64, 3.83, 3.85, 628, 442, 446, 320; 365/125, 49

[56] References Cited

U.S. PATENT DOCUMENTS

| | | | |
|---|---|---|---|
| 3,865,467 | 2/1975 | von Thuna | 350/102 |
| 4,703,992 | 11/1987 | Yeh | 350/3.64 |
| 4,721,362 | 1/1988 | Brody et al. | 350/3.64 |
| 4,739,496 | 4/1988 | Marom et al. | 365/125 |
| 4,750,153 | 6/1988 | Owechko et al. | 356/125 |
| 4,768,846 | 9/1988 | Connors et al. | 350/3.64 |

OTHER PUBLICATIONS

G. J. Dunning et al, "All-optical associative memory with shift invariance and multiple-image recall", Optics Letters, vol. 12, May 1987, pp. 346-348.
B. H. Soffer et al, "Associative holographic memory with feedback using phase-conjugate mirrors", Optics Letts. vol. 11, Feb. 1986, pp. 118-120.
F. Laeri, et al, "Coherent CW image amplifier and oscillator using two-wave interaction in a BaTiO$_3$ Crystal", Optics Communications, vol. 47 No. 6, Oct. 15, 1983, pp. 387-390.
J. Feinberg, et al, "Photorefractive effects and light-induced charge migration in barium titanate", J. Appl. Phys. 51(3), Mar. 1980, pp. 1297-1305.
J. Feinberg, "Optical phase conjugation in photorefractive materials", Academic Press, 1983, pp. 417-443.
T. R. O'Meara, "Wavefront compensation with pseudoconjugation", Optical Engineering, vol. 21, No. 2, Mar.-/Apr. 1982, pp. 271-280.
S. F. Jacobs, "Experiments with retrodirective arrays", Optical Engineering vol. 21, No. 2, Mar./Apr. 1982, pp. 281-283.

*Primary Examiner*—Rodney B. Bovernick
*Assistant Examiner*—Loha Ben
*Attorney, Agent, or Firm*—V. D. Duraiswamy; P. M. Coble; W. K. Denson-Low

[57] ABSTRACT

A low noise system and method for both amplifying and retroreflecting an information-bearing probe beam employs a two-wave mixer in conjunction with a pseudoconjugating element. The probe beam is amplified by two-wave mixing in a photorefractive medium, while the pseudoconjugator is arranged to retroreflect the amplified probe beam back through the photorefractive medium such that optical distortions imposed upon the beam during the amplifying pass are compensated, yielding an output with a high signal-to-noise ratio. Various types of pseudoconjugating elements may be used.

10 Claims, 3 Drawing Sheets

SYSTEM AND METHOD FOR LOW NOISE OPTICAL RETROREFLECTION WITH GAIN

BACKGROUND OF THE INVENTION

1. Field of the Invention

This invention relates to systems and methods for processing optical data, and more particular to the amplification and retroreflection of an optical information bearing beam.

2. Description of the Related Art

Optical amplification and retroreflection are two functions that are used in various stages in the processing of optical data. The two functions are incorporated together in an optical associative memory for pattern recognition, such as the systems disclosed in U.S. Pat. Nos. 4,739,496 to Marom, et al., "Associative Holographic Memory Apparatus Employing Phase Conjugate Mirrors", and 4,750,153 to Owechko, et al., "Associative Holographic Memory Apparatus Employing Phase Conjugate Mirrors and a Two-Wave Mixing Contra-Directional Coherent Image Amplifier", both assigned to Hughes Aircraft Company, the assignee of the present invention. Associative memories are also discussed in Dunning, et al., "All-Optical Associative Memory with Shift Invariance and Multiple-Image Recall", *Optics Letters,* Vol. 12, No. 5, May 1987, pages 346-348, and Soffer, et al., "Associative Holographic Memory with Feedback Using Phase-Conjugate Mirrors", *Optics Letters,* Vol. 11, No. 2, February, 1986, pages 118-120. Amplification and retroreflection functions are also combined in optical computers to amplify and redirect a two-directional array of data.

Various devices for optical amplification and/or retroreflection use photorefractive materials. In such materials, the index of refraction changes under the influence of applied light, such as a laser beam. The light causes charges within the photorefractive material to migrate and separate, producing an internal space charge electrostatic field. This field produces a change in the crystal's refractive index by the linear electro-optic effect (the Pockels effect). Photorefractive materials generally comprise $BaTiO_3$, $Bi_{12}SiO_{20}$, $KTa_{1-x}Nb_xO_3$, BGO and $LiNbO_3$, and III-V and II-VI semiconductor materials within the periodic table, such as, for example, GaAs and InP.

Optical amplification, without retroreflection, has been accomplished by two-wave mixing in a photorefractive crystal. An information bearing probe beam intersects a pump beam within the crystal. With a proper crystal orientation relative to the two beams, energy is transferred from the pump to the probe beam to amplify the latter. While ideally the probe beam would simply be amplified without any other change, in practice the photorefractive crystal will frequently impose unwanted additional phase information upon the probe beam, thus distorting its information content. Two-wave mixing within photorefractive materials is discussed in Laeri, et al., "Coherent CW Image Amplifier and Oscillator Using Two-Wave Interaction in a $BaTiO_3$-Crystal", *Optics Communications,* Vol. 47, No. 6, Oct. 15, 1983, pages 387-390, and also in Feinberg, et al., "Photorefractive Effects and Light Induced Charge Migration in Barium Titanate", *Journal of Applied Physics,* Vol. 51, No. 3, March, 1980, pages 1297-1305.

High gain laser media, such as metal vapors or dyes, have also been used for optical amplification. However, due to the spontaneous decay of the excited states, these systems are noisy and require an intense input to have a useful signal-to-noise ratio. This often leads to pulsed amplification, as opposed to the two-wave mixing technique which can operate continuously at flux intensities on the order of milliwatts per $cm^2$.

Turning now to retroreflection, a special form of retroreflection referred to as phase conjugation has been achieved with devices known as phase conjugate mirrors (PCMs). A PCM produces a retroreflection of an incident beam, with the phase of the reflected beam reversed from that of the incident beam at the point of reflection. Several different ways of producing phase conjugated beams have been discussed in the literature, including four-wave mixing and self-pumped mechanisms. The theory and operation of PCMs, along with an explanation of the photorefractive effect, is described in a chapter by Feinberg, "Optical Phase Conjugation in Photorefractive Materials", within the text "Optical Phase Conjugation", ed. by Fisher, Academic Press, Inc., 1983, pages 417-443. Of the self-pumped PCMs, those employing Brillouin or Raman scattering are generally used with high power pulsed laser beams, such as from a Nd:YAG laser, but are not practical with low power continuously operated lasers such as HeNe or low flux Argon ion laser devices. Another type of self-pumped PCM uses a photorefractive material with a high electro-optical coefficient as the phase conjugating medium. This type of self-pumped PCM has been employed with continuously operating, low-power lasers, but tends to produce a somewhat noisy conjugated output. After a long buildup time, the self-pumped PCMs emit a conjugated output, but do not provide amplification.

Another class of devices that perform retroreflection but not amplification is referred to as "pseudoconjugators". These devices resemble PCMs in that they retroreflect incident beams. However, they do not perform a true conjugation or wavefront reversal on the incident wavefront. Pseudoconjugators have commonly been configured as arrays of corner reflectors. Such devices are discussed in articles by O'Meara, "Wavefront Compensation with Pseudoconjugation", *Optical Engineering,* Vol. 21, No. 2, March/April 1982, pages 271-280, and in Jacobs, "Experiments with Retrodirective Arrays", *Optical Engineering,* Vol. 21, No. 2, March/April 1982, pages 281-283. In the O'Meara article, the use of a pseudoconjugator in a double-pass reflective conjugation compensation system is illustrated in FIG. 2(a). In such a system, an input beam is initially transmitted through a distorting medium, and then retroreflected by a pseudoconjugator back through the distorting medium to remove the distortions.

While pseudoconjugators do achieve a retroreflection function, they are non-amplifying. Also, they include no inherent mechanism to compensate for noise in an input beam.

A combination of both amplification and retroreflection has been achieved with the four-wave mixer PCM. Such a device is illustrated in simplified form in FIG. 1. A pair of contradirectional laser beams 2 and 4 are directed into a photorefractive mixing medium 6. An initializing laser beam $E_i$, equal in frequency to beams 2 and 4, is directed into the mixing medium from the side. As a result of the action of the various beams within the mixing medium, a reflected beam $RE_i^*$, where R is the coefficient of reflectivity, is reflected back in a direction opposite to incident beam $E_i$. Since power is pumped into the system by beams 2 and 4, the PCM may be configured to provide an amplification which makes R greater than 1.

A system for implementing a four-wave mixer is illustrated in FIG. 2. An input beam 8 is divided by a beam splitter 10 into first and second beams 12 and 13. Beam 12 passes through an optical mask 14, from which it acquires information. A portion of the beam is diverted for input monitoring by a beam splitter 15, while the remainder is focused by a lens 16 as the probe beam $E_i$. The second beam 13 is reflected off a mirror 18 to a beam splitter 20, from which it emerges as pump beams 2 and 4. These beams are reflected off mirrors 22 and 24, respectively, and directed into the photorefractive mixing medium 6. The conjugated return beam is deflected by beam splitter 15 to yield an output beam 25.

The system of FIG. 2 is fairly complex to set up, since all of the beams must interact within the same volume of the non-linear photorefractive medium 6, and careful alignment is required. While the system is illustrated for only a single beam at a single frequency, in practice beams with multiple frequencies may be used. Since pump beams must be provided with the same frequency as the probe beam for each different frequency, additional equipment and alignment complexity may be required.

Another limitation of the four-wave mixing approach is encountered when a very rapid system response is desired. In this situation, a four-wave mixing system will often use sodium vapor as the non-linear medium. However, sodium vapor requires a very small angle, on the order of one-half to two degrees, between the pump and probe beams. Since some amount of spreading is normally associated with the probe beam which bears complex spatial information, this small angle requirement can significantly restrict the probe beam's information carrying capability.

SUMMARY OF THE INVENTION

The purpose of the present invention is to provide a system and method which accomplishes both optical retroreflection and amplification, and yet avoids mechanical complexity and severe alignment problems, is broadband in operation, has a fast response, and achieves a high signal-to-noise ratio.

The invention achieves these goals by amplifying a probe beam with a two-wave mixer, using a pseudoconjugate reflector to direct the amplified probe beam back through the two-wave mixer, and compensating within the mixer for phase distortions which were imposed on the probe beam during its initial amplifying pass.

Various implementations for the pseudoconjugator may be employed. When the probe beam is substantially collimated, a corner cube array will provide a pixelized return beam. When the probe beam is convergent, the pseudoconjugator may consist of a convergent lens positioned in the path of the probe beam after amplification and spaced from the non-linear photorefractive medium by its focal length, together with a flat mirror which reflects the amplified probe beam back through the lens and the non-linear medium. Alternately, a curved mirror may be positioned in the path of the amplified probe beam, with its radius of curvature centered on the nonlinear medium.

A non-linear medium such as barium titanate is used. To inhibit any transfer of energy between the pump and the probe beams after the probe beam has been retroreflected, the amplified probe beam is preferably directed back through the non-linear medium along substantially the same path as its first pass, but in the opposite direction.

Other features and advantages of the invention will occur to those skilled in the art from the following detailed description of preferred embodiments, taken with the accompanying drawings, in which:

DETAILED DESCRIPTION OF THE INVENTION

Figure 1:
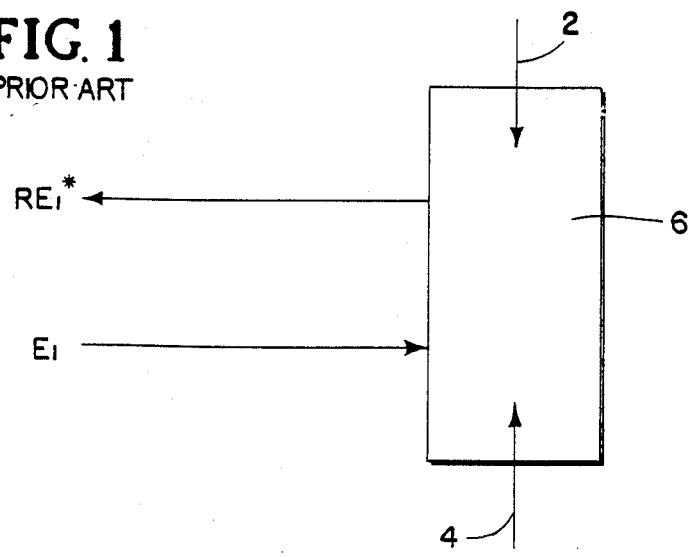
FIGS. 1 and 2 are diagrams of a known four-wave mixer and of an optical system employing such a mixer, respectively, which were described above.
Figure 2:
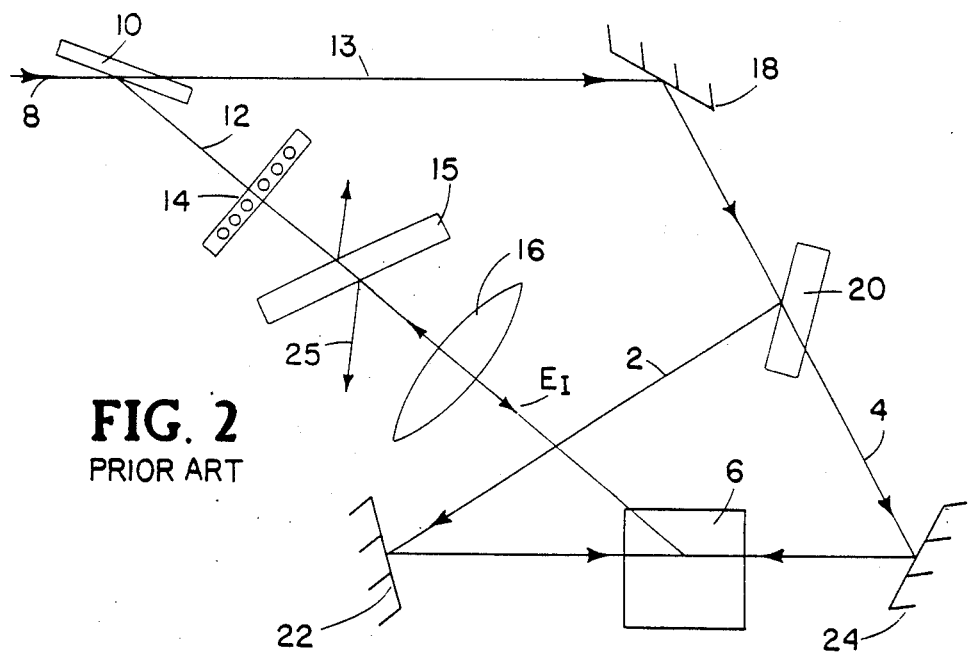
Figure 3:
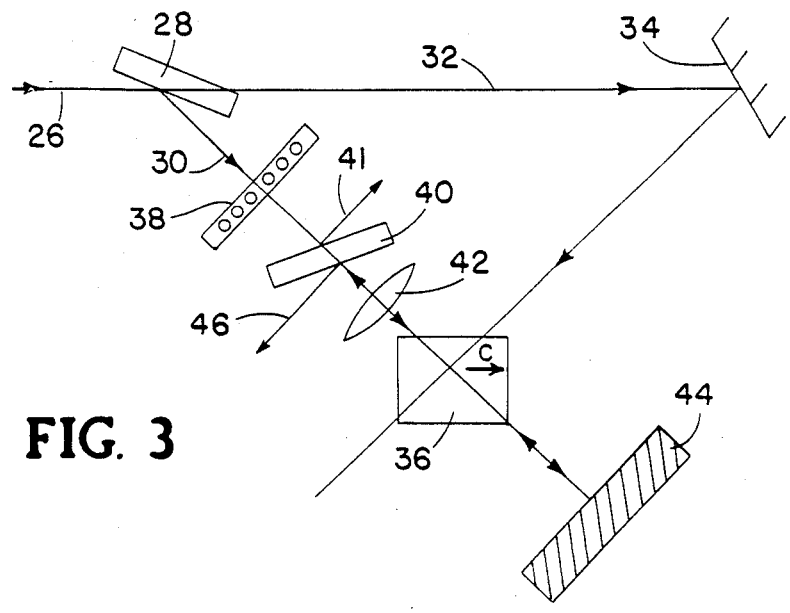
FIG. 3 is a diagram of an optical gain and retroreflection system constructed in accordance with the invention.

One example of a system in accordance with the present invention is shown in FIG. 3. An input beam 26 is divided by beam splitter 28 into a relatively weak probe beam 30, and a relatively strong pump beam 32. The pump beam 32 is reflected off a mirror 34 into a non-linear photorefractive medium 36, such as a barium titanate crystal or any other medium suitable for two-wave mixing.

Probe beam 30 acquires a desired information format by transmission through a transmission mask 38, spatial light modulator, or other suitable mechanism for applying information to the beam, typically in the form of a phase and/or amplitude modulation. The probe beam 30 continues through a beam splitter 40, where a first portion 41 is diverted for input monitoring, and the remaining portion is then focused onto the photorefractive medium 36 by a lens 42. While it is not an essential part of the invention, focusing of the probe beam is normally done both because the input beam image is typically larger than the size of crystal 36, and because focusing increases the beam's flux within crystal 36, thereby improving the crystal's response time.

The pump beam 32 and probe beam 30 intersect within the photorefractive crystal 36, which is oriented to produce a two-wave mixing transfer of energy from the pump to the probe beam. This is achieved by positioning crystal 36 so that its C-axis points in the direction of rotation from the pump beam direction to the probe beam direction.

The probe beam 30 is thus amplified during its transit through crystal 36. After leaving the crystal, the amplified beam is retroreflected by a pseudoconjugator 44, which directs it back through the crystal parallel to its original amplifying pass, but in the opposite direction. The returned beam is then collimated by lens 42 and split by beam splitter 40 to yield a phase or amplitude modulated output beam 46.

The return of the probe beam back through the photorefractive crystal 36 after it has been amplified is an important aspect of the invention. With an ideal two-wave mixer, the photorefractive medium will not introduce any distortions in either the phase or the amplitude information carried by the probe beam. However, in practical systems, some amount of distortion is normally introduced; changes in phase caused by the photorefractive medium result in additional degrees of divergence or convergence within the beam. In accordance with the invention, returning the amplified probe beam back through the photorefractive medium results in a substantial removal of such distortions. Since the return beam travels in the opposite direction to the original input probe beam, there will be no appreciable energy transfer between the return beam and the pump beam. Thus, a C-axis asymmetry is established which results in an energy transfer between beams only during the probe beam's initial transit through the photorefractive medium, and yet produces a symmetrical operation with respect to the removal of distortions initially introduced by the photorefractive medium.

Figure 4:
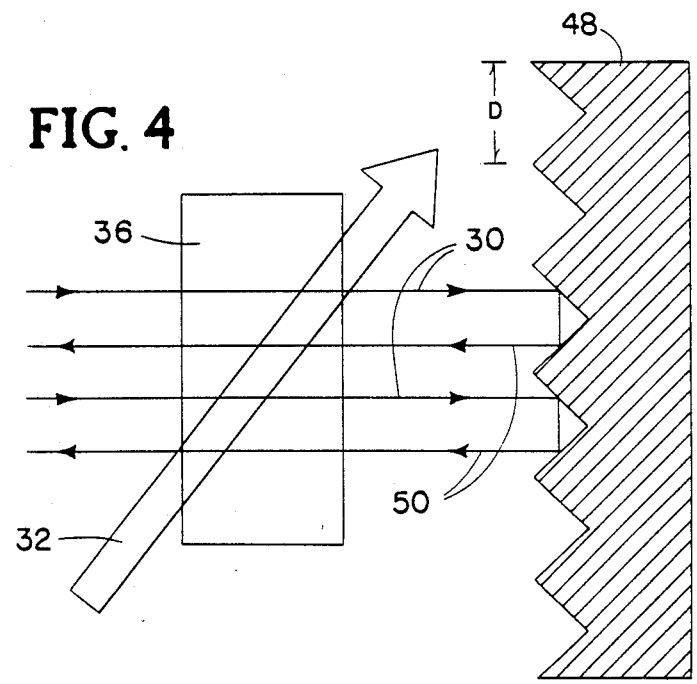
FIGS. 4–6 are diagrammatic elevation views showing the operation of different types of pseudoconjugators with the invention.

Various possible embodiments for pseudoconjugator 44 will now be described. In FIG. 4, a corner cube array 48 provides the pseudoconjugating element. Probe beam 30 is illustrated as a collimated beam, but it could also be converging. The corner cube array 48 should be large enough and close enough to photorefractive crystal 36 to receive the entire probe beam. Probe beam 30 passes through crystal 36, where it is amplified by pump beam 32. The amplified signal propagates to the corner cube array 48. Each ray within the beam undergoes multiple reflections at the corner cube array, as indicated in the FIG. As the characteristic corner cube element size D is made smaller, the retroreflected return rays 50 propagate closer to the paths of their respective incident rays. As the total number of retroreflecting elements increases and the element size decreases, the return rays approach a smooth retroreflection of the incident signal.

Figure 5:
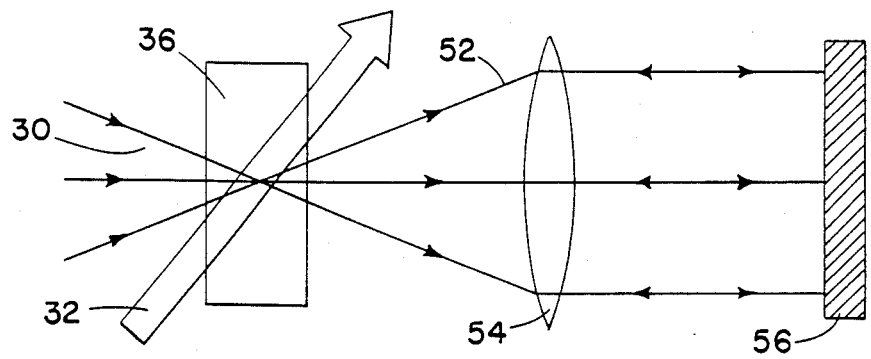

Another embodiment, shown in FIG. 5, is designed particularly for a converging beam 30. The beam is focused into the photorefractive crystal 36, where it is amplified by pump beam 32. A crossover occurs within the crystal, so that the amplified probe beam emerges as an expanding beam 52. This beam is collimated by a lens 54, which is positioned at one focal length from the two-wave mixer. The beam then propagates parallel to the optic axis of the device, and is reflected back off a substantially flat mirror 56 which is positioned at right angles to the propagation axis. The light then counterpropagates back over its original path and through the photorefractive medium 36, in the opposite direction to its first pass. Again, distortions introduced by the photorefractive medium are substantially compensated during the reverse pass. The return beam can be diverted from the original path after it has passed back through the photorefractive medium, and its information content observed or used in further processing.

Figure 6:
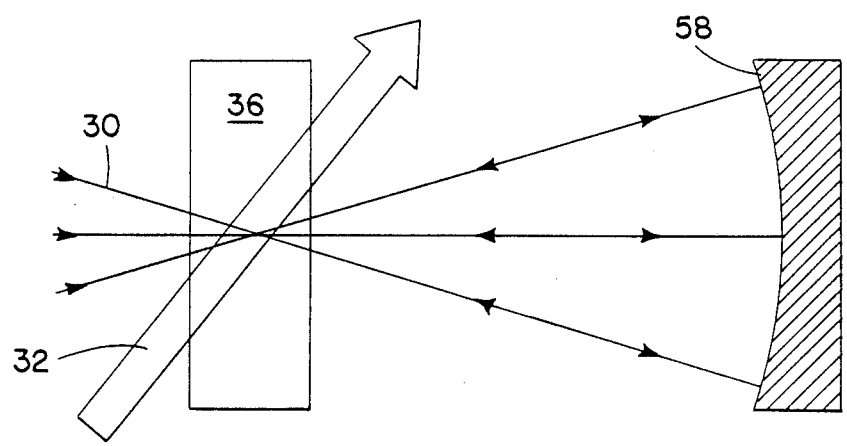

FIG. 6 illustrates a third embodiment for a pseudoconjugator, in which the separate functions of the lens 54 and flat mirror 56 in FIG. 5 are combined in a single optical element implemented as a curved mirror 58. This reduces the distance between the two-wave mixer and the pseudoconjugator, thereby reducing the effects of any misalignment within the system. Mirror 58 has a radius of curvature which is equal to the distance between the mirror and photorefractive crystal 36, and centered upon the crystal. It can be placed at the position occupied by lens 54 in FIG. 5.

The invention has been demonstrated in an associative memory. The associative memory originally employed a degenerate four-wave mixing PCM to produce optical feedback and gain. The PCM was replaced by a pseudoconjugate optical gain system of the type illustrated in FIG. 5. Two-wave mixing was accomplished in a barium titanate crystal. A lens with an F number equal to one was placed between the crystal and a flat mirror at one focal length (7.6 cm) from the crystal. Incident light was successfully amplified and retroreflected. An iris between the crystal and mirror, which limited the number of undesired light rays collected by the lens, was required to obtain a resolution comparable to that achieved with the PCM. Of course, since the PCM produces the exact phase conjugate of the probe beam, whereas the present invention outputs a retroreflected but not true phase conjugated beam, the PCM inherently has a somewhat higher resolution.

The described system can produce a virtually noise-free amplification of complex two-dimensional optical images with grey scale. The holographic nature of the two-wave amplification can produce high resolution, exceeding a thousand lines/mm. The area over which this resolution is achievable ranges from several square mm to a few square cm, and is primarily limited by the area of the interaction region within the photorefractive medium. The amplification factor of several thousands can be obtained for intensity fluxes routinely employed in the laboratory.

The invention is particularly useful when a fast response is desired. In contrast to four-wave mixing PCMs employing sodium vapor for this purpose, in which the information capacity of the probe beam is restricted because of the small angle requirement between the probe and pump beams, with the present invention there is no such restriction. There can be a significant angle between the two beams, thereby allowing the full information capacity of the probe beam to be employed. The pseudoconjugating elements described herein have essentially instantaneous response times; the responsivity of the system as a whole is determined by the response time of the photorefractive medium. The pseudoconjugating elements also have the advantage of being very broad band, and can handle a wide range of frequencies. The importance of the simplicity in the mechanical setup required by the present invention becomes even more important as more frequencies are present.

While several illustrative embodiments of the invention have been shown and described, numerous variations and alternate embodiments will occur to those skilled in the art, without departing from the spirit and scope of the invention. Accordingly, it is intended that within the scope of the appended claims, the present invention may be practiced otherwise than as specifically described.

I claim:

1. A pseudoconjugate optical gain system, comprising:
   two-wave mixing means for amplifying an information bearing probe beam with a pump beam, and
   pseudoconjugate reflector means positioned with respect to the two-wave mixing means to retroreflect an amplified probe beam from the two-wave mixing means back through the two-wave mixing means to compensate for phase distortions imposed on the probe beam during amplification thereof.

2. The system of claim 1, wherein said pseudoconjugate reflector means is disposed with respect to the two-wave mixing means to retroreflect the amplified probe beam back through the two-wave mixing means substantially parallel to and in a direction opposite to the probe beam before retroreflection, thereby inhibiting any substantial transfer of energy between the pump and amplified probe beams after retroreflection.

3. A pseudoconjugate optical gain system, comprising:
   a nonlinear photorefractive medium,
   means for directing an information bearing probe beam in a first pass through said medium,
   means for directing a pump beam having a frequency substantially equal to that of the probe beam through said medium to establish two-wave mixing therein and an amplifying transfer of power from the pump beam to the probe beam, and
   retroreflector means positioned in the path of the amplified probe beam, said retroreflector means retroreflecting said amplified probe beam back through the nonlinear medium for removal of phase distortions imposed on the probe beam during its first pass through the nonlinear medium.

4. The system of claim 3, said retroreflector means comprising a corner cube array.

5. The system of claim 3, said retroreflector means comprising a convergent lens positioned in the path of the amplified probe beam and spaced from the nonlinear photorefractive medium by a distance approximately equal to the lens focal length, and a substantially flat mirror positioned to reflect the amplified probe beam transmitted through the lens back through the lens to the nonlinear medium.

6. The system of claim 3, said retroreflector means comprising a curved mirror positioned in the path of the amplified probe beam, said mirror having a radius of curvature centered upon the nonlinear medium.

7. The system of claim 3, wherein said nonlinear medium comprises barium titanate.

8. The system of claim 3, wherein said retroreflector means is disposed relative to the nonlinear medium to retroreflect the amplified probe beam back through the nonlinear medium along substantially the same path as said first pass but in the opposite direction, thereby inhibiting transfer of energy between the pump and amplified probe beams after retroreflection of the probe beam.

9. A method for amplifying an information bearing optical probe beam, comprising,
   amplifying said probe beam in a nonlinear photorefractive medium by two-wave mixing with a pump beam to produce an amplified probe beam,
   retroreflecting said amplified probe beam, and
   directing the retroreflected amplified probe beam back through said nonlinear medium to remove phase distortions imposed upon the probe beam during amplification.

10. The method of claim 9, wherein the probe beam is directed through the nonlinear medium along a first path for amplification, and the amplified probe beam is retroreflected back through the nonlinear medium along a path substantially parallel to said first path but in the opposite direction, thereby inhibiting any substantial transfer of power between the pump and amplified probe beams after retroreflection.

* * * * *